Patented Apr. 8, 1952

2,592,254

UNITED STATES PATENT OFFICE 2,592,254

MONOMERS AND POLYMERS OF VINYL CARBAMIC ACID DERIVATIVES AND THEIR PREPARATION

Joseph B. Dickey, Rochester, N. Y., assignor to Eastman Kodak Company, Rochester, N. Y., a corporation of New Jersey No Drawing. Application January 29, 1948, Serial No. 5,206

8 Claims. (Cl. 260—77.5)

1

This invention relates to monomers and polymers of amides or esters of unsaturated carbamic acids and their preparation.

This application is a continuation-in-part of application Serial No. 532,645 filed April 25, 1944, now abandoned.

One object of my invention is to provide amides or esters of vinyl carbamic acids. Another object of my invention is to provide polymers of the amides or esters of vinyl carbamic acids. A further object of my invention is to provide a method of preparing polymers of vinyl carbamic acid derivatives. A still further object of my invention is to provide a method of preparing amides or esters of vinyl carbamic acids. Other objects of my invention will appear herein.

The amides or esters of unsaturated carbamic acids are prepared by reacting ureas or urethanes with unsaturated compounds having a triple bond, particularly substituted or unsubstituted acetylene, such as acetylene, methyl acetylene, ethoxy acetylene, phenyl acetylene, and the like. In its broadest aspects this process involves the treating of a urea or a urethane with acetylene or a substituted acetylene in the presence of a catalyst promoting the reaction at an elevated temperature and pressure. There results therefrom carbamic acid derivatives having unsaturated groups therein. The formula of these derivatives is:

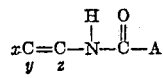

$x$, $y$ and $z$ being alkoxy, alkyl, alkoxyalkyl or aryl and A being a saturated amide or OR group. Polymers are then prepared from these carbamic acid derivatives by mixing with suitable monomers subjecting to heat under polymerizing conditions.

The monomers which when mixed with the unsaturated carbamic acid derivatives and polymerized form polymers of value are: vinyl acetate, acrylonitrile, methyl methacrylate, vinyl chloride, acrylic acid and acrylamide. The mixtures employed should consist essentially of 20–80 mol. per cent of the carbamic acid derivatives and 80–20 mol. per cent of one or a mixture of the monomers listed.

Some of the mixtures which are polymerized in accordance with my invention to obtain polymerized products of good properties are:

Dimethyl amide of vinyl carbamic acid—vinyl acetate
Simple amide of isopropenyl carbamic acid—vinyl acetate

2

Ethyl ester of vinyl carbamic acid—vinyl acetate
Dimethyl amide of vinyl carbamic acid—acrylonitrile
Methyl ester of isopropenyl carbamic acid—methyl methacrylate
Simple amide of isopropenyl carbamic acid—methyl methacrylate
Diethyl amide of phenyl vinyl carbamic acid—acrylonitrile
Furyl ester of vinyl carbamic acid—methyl methacrylate
Cyclohexyl ester of vinyl carbamic acid—vinyl acetate
Dimethyl amide of ethoxy vinyl carbamic acid—vinyl acetate
Methyl ester of isopropenyl carbamic acid—methyl methacrylate
Dimethyl amide of vinyl carbamic acid—vinyl chloride The carbamic acid derivatives may be present in the mixture in a proportion of from 20 to 80 mol. per cent, the other monomer being 80 to 20 mol. per cent.

The character of the resulting polymer is influenced to a degree by the relative proportions of the monomers employed in the mixture which is polymerized.

The esters of unsaturated carbamic acids which may be used may be those in which alkyl, aryl, alkylene, carbocyclic or heterocyclic radicals replace the hydrogen of the carboxyl. The alkyl esters particularly of interest are those in which the alkyls are 1–5 carbon atoms such as methyl, ethyl, iso-propyl, propyl, butyl, iso-butyl and iso-amyl. The aryl esters are preferably phenyl and cresyl esters. The heterocyclic esters of most interest are the furyl esters. The cyclohexyl esters are of principal interest among the carbocyclic esters and are representative of those compounds.

The carbamic acids, the amides or ester of which are suitable may be simply vinyl carbamic acids, i. e. those in which all of the substituents on the vinyl groups are hydrogen, or they may be carbamic acids in which the substituents on one or both of the carbons of the unsaturated groups are hydrocarbon substituents, such as alkyl, alkoxy, alkoxyalkyl or aryl. When other than hydrogen substituents are present on the carbons of the unsaturated groups the groups therein are primarily for the purpose of imparting different characteristics to the carbamic acid derivative polymers. The other substituent on the nitrogen of the carbamic acid is hydrogen. Where "unsaturated carbamic acids" are referred to herein, the carbamic acids having an unsaturated hydrocarbon group such as iso-propenyl, vinyl and alkoxyvinyl on the nitrogen of the carbamic acid are meant.

Ordinarily the preparation of the amides or esters of unsaturated carbamic acids is carried out by heating a urea having the formula

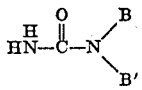

B and B' being hydrogen or alkyl or a urethane having the formula

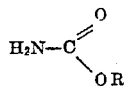

R being alkyl, aryl, alkylene etc. with acetylene or a substituted acetylene in the presence of a catalyst, particularly a mixture of alkali and zinc oxide preferably using a solvent. One solvent which has been found to be quite suitable is dimethyl cyclohexane. However, other solvents may be used for this reaction particularly if those solvents are compounds without active hydrogens, such as the hydrocarbons generally. The useful solvents may be either petroleum distillates, such as Stoddard solvent or kerosene or aromatic hydrocarbons, such as toluene, xylene, or naphthalene (when above melting temperature). The reaction is conveniently carried out in an enclosed vessel such as an autoclave at a pressure of at least 25 atmospheres and at an elevated temperature. I have found that temperatures within the range of 150–200° C. are preferred although temperatures outside of this range may be found useful for promoting the reaction. The pressure in the vessel is ordinarily obtained by means of the acetylene, either alone or mixed with some other inert gas, such as nitrogen or helium, when the simple vinyl carbamic acid derivative is prepared. Where the reagent is not gaseous, inert gas such as nitrogen or helium is depended on for aid in supplying the desired pressure.

The following examples illustrate the preparation of amides and esters of vinyl carbamic acids in accordance with my invention. Instead of vinyl groups, other unsaturated groups, such as isopropenyl, alkoxyvinyl or arylvinyl may be incorporated, this being accomplished by means of an alkyl acetylene, alkoxy acetylene or phenyl acetylene.

Example 1.—A high pressure stainless steel autoclave was charged with 50 parts of N,N-dimethyl urea, 50 parts of dimethyl cyclohexane, 3 parts of powdered potassium hydroxide, and 0.5 part of zinc oxide. The autoclave was closed and was heated to 170–180° C. while under a pressure of 25–30 atmospheres, obtained by introducing under pressure acetylene diluted with 25% of nitrogen. The heating was continued at this temperature for four hours, the autoclave was then cooled, and the pressure was released. There was obtained the dimethyl amide of vinyl carbamic acid.

Example 2.—There was placed in a high pressure stainless steel autoclave 50 parts of ethyl urethane, 50 parts of dimethyl cyclohexane, 3 parts of powdered potassium hydroxide, and 0.5 part of zinc oxide. The autoclave was heated to 170–180° C. and maintained at that temperature for four hours while under a pressure of 25–30 atmospheres imparted by introducing under pressure acetylene diluted with 25% of nitrogen. The autoclave was cooled and the pressure was released. The resulting material was subjected to fractional distillation under reduced pressure (0.1 mm. of mercury). The ethyl ester of vinyl carbamic acid was obtained.

Example 3.—A stainless steel autoclave was charged with 50 parts of N,N-dimethyl urea, 50 parts of dimethyl cyclohexane, 40 parts of methyl acetylene, 3 parts of powdered potassium hydroxide, and 0.5 part of zinc oxide. The autoclave was heated to 170–180° C. for four hours under 20–30 atmospheres of nitrogen pressure. The autoclave was then cooled and the pressure was released. The mass was then subjected to fractional distillation under reduced pressure as in the preceding example, and the product obtained was the dimethyl amide of isopropenyl carbamic acid.

The products thus obtained were water-white viscous liquids of high boiling point. Hydrocarbon substituents may be substituted for the hydrogens in the vinyl group of the vinyl carbamic acids. For instance, alkoxy or ethyl groups may be present in the vinyl grouping such as would result in the above reactions when ethoxy acetylene or ethyl acetylene is employed for the reaction upon the ureas or the urethanes. If aryl groups are desired, an aryl acetylene, such as phenyl acetylene should be employed. In the resulting products the substituents end up mainly in the alpha position of the vinyl group although some of the substituents will attach to the beta carbon thereof.

The polymerization of the mixture of the unsaturated carbamic compounds and the monomers as described herein is carried out by subjecting that mixture to an elevated temperature using polymerization procedures, such as described in the prior art. For instance, the polymerization may be carried out by heating the mixture in a sealed tube. On the other hand, it may be carried out by forming an aqueous emulsion of the mixture to be polymerized with a suitable wetting agent such as a sodium alkyl naphthalene sulfonate the alkyl having less than 6 carbon atoms and polymerizing by heating with an oxygen catalyst therein. Instead, the polymerization may be carried out by the bead method or by conducting the polymerization of the mixture while in solution in an organic solvent. It is often desirable to carry out the polymerization at elevated pressures such as above 750 atmospheres. For instance, it is often desirable to carry out a polymerization using a pressure of 1000 atmospheres or more to obtain the desired product. There is no limit on the maximum pressure used this being only governed by the ability of the containing vessel.

Polymerization using the mixture of monomers in accordance with my invention may be impelled by any of the means heretofore employed for this purpose. For instance, heat and oxygen catalysts are particularly efficacious for promoting the polymerization of the mixtures described herein, although catalysts, such as boron trifluoride, tin tetrachloride or the like might be employed. Some of the oxygen catalysts which are useful for promoting polymerization in accordance with my invention are benzoyl peroxide, hydrogen peroxide, acetyl peroxide, oxygen, ozone, urea peroxide and tetralin peroxide.

The following examples illustrate the preparation of polymers in accordance with my invention:

Example 4.—10 parts of methyl ester of vinyl carbamic acid prepared by reacting methyl urethane with acetylene were mixed with 5 parts of vinyl acetate and 0.02 part of benzoyl peroxide, and the mixture was heated in a sealed tube at 50° C. for several days and finally at 100° C. for a few hours. A white solid resulted which product could be employed for coating wires or for molding by means of heat and pressure.

*Example 5.*—11 parts of an ethyl ester of isopropenyl carbamic acid prepared by reacting ethyl urethane with methyl acetylene were mixed with 4 parts of methyl methacrylate and the mixture was heated at 130° C. for a sufficient time to obtain complete polymerization. A yellowish white solid resulted which was soluble in acetic acid and acetone.

*Example 6.*—A mixture of 10 parts of the diethyl amide of isopropenyl carbamic acid prepared by reacting N,N-diethyl urea with methyl acetylene, 10 parts of the phenyl ester of isopropenyl carbamic acid prepared by reacting a phenyl urethane with methyl acetylene and 12 parts of acrylonitrile were mixed together and were heated at 130° C. which caused polymerization to occur. When it appeared that sufficient polymerization had occurred, the heating was discontinued. The resulting product was found to be easily molten and was useful for coating metal surfaces for molding or for the formation of films from an acetone solution of the resin.

*Example 7.*—16 parts of beta methoxyethyl isopropenyl carbamic acid as prepared by reacting beta methoxyethyl urethane with a methyl acetylene were mixed with 9 parts of vinyl acetate, and the mixture was polymerized in a sealed tube at 40–100° C. using .05 part of benzoyl peroxide as a catalyst. A white solid was obtained which was soluble in organic solvents, such as acetic acid, acetone, formic acid, and the like.

*Example 8.*—14 parts of the diethyl amide of isopropenyl carbamic acid prepared in accordance with the process described herein were mixed with 50 parts of methyl methacrylate and 0.1 part of benzoyl peroxide. The mixture was heated at 40° C. until it appeared that the polymerization had been completed. The product was a colorless solid soluble in acetic acid or acetone.

*Example 9.*—15 parts of the phenyl ester of alpha ethyl vinyl carbamic acid prepared as described herein were mixed with 50 parts of isopropenyl acetate in 100 parts of diisopropyl fumarate, the mixture being dispersed in 500 parts of water containing 2 parts of gum arabic. 0.3 part of benzoyl peroxide were also added. The dispersion was placed in an enclosed vessel with some free space therein, and the mass was tumbled at 50° C. for twenty-four hours and then at a temperature of 60–70° C. for five or six hours. A polymer in the form of beads was obtained which was removed, filtered, washed with water and dried. It was found to be a moldable, colorless, tough solid.

The copolymers obtained in accordance with my invention differ from one another in physical properties, such as hardness and softening temperatures. These polymers also possess the unique advantage of containing reactive amino groups which is especially valuable in the making of textile fibers therefrom or for incorporating in natural or synthetic fibers. These resins are also susceptible to coloration by acid dyes which is of value in many uses. The compounds which are useful in admixture with other monomers for preparing polymers in accordance with my invention are the esters or amides of the acids having the following structural formula:

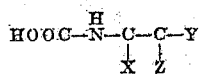

where X, Y, and Z are either hydrogen or hydrocarbon groups, such as alkyl, aryl, alkoxy or alkoxyalkyl substituents.

There is nothing critical about the vacuums employed for isolating the compounds specified herein. A pressure of .1 mm. of mercury has ordinarily been found to be suitable. However, other reduced pressures may be employed with good effect. It is to be understood that the disclosure of my application Serial No. 532,645 filed April 25, 1944, is to be regarded as part of the specification here.

I claim:

1. A method of preparing polymers which comprises first heating urea with acetylene under pressure and mixing the resulting product with vinyl acetate and heating the resulting mixture whereby a polymerized product is obtained.

2. A method of preparing polymers which comprises heating methyl urethane with acetylene under pressure, mixing the resulting product with vinyl acetate and heating the mixture whereby a polymerized product is obtained.

3. A method of preparing polymers which comprises heating together under polymerizing conditions 80–20 mol percent of a monomer selected from the group consisting of vinyl acetate, acrylonitrile, methyl methacrylate, vinyl chloride, acrylic acid and acrylamide, and 20–80 mol percent of an ester having the following formula:

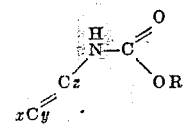

R being a radical selected from the group consisting of alkyl, alkylene, and carbocyclic radicals, and $x$, $y$, and $z$ being selected from the group consisting of hydrogen, alkyl, aryl, and alkoxy.

4. A method of preparing polymers which comprises heating together under polymerizing conditions 80–20 mol percent of vinyl acetate and 20–80 mol percent of an ester having the following formula:

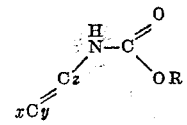

R being a radical selected from the group consisting of alkyl, alkylene, and carbocyclic radicals, and $x$, $y$, and $z$ being selected from the group consisting of hydrogen, alkyl, aryl, and alkoxy.

5. A method of preparing polymers which comprises heating together under polymerizing conditions 80–20 mol percent of acrylonitrile and 20–80 mol percent of an ester having the following formula:

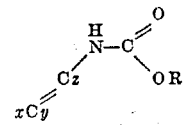

R being a radical selected from the group consisting of alkyl, alkylene, and carbocyclic radicals, and $x$, $y$, and $z$ being selected from the group consisting of hydrogen, alkyl, aryl, and alkoxy.

6. A method of preparing polymers which comprises heating together under polymerizing conditions 80–20 mol percent of methyl methacrylate and 20–80 mol percent of an ester having the following formula:

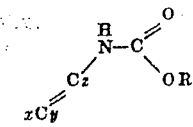

R being a radical selected from the group consisting of alkyl, alkylene, and carbocyclic radicals, and $x$, $y$, and $z$ being selected from the group consisting of hydrogen, alkyl, aryl, and alkoxy.

7. A method of preparing polymers which comprises heating together under polymerizing conditions 80–20 mol percent of isopropenyl acetate and 20–80 mol percent of an ester having the following formula:

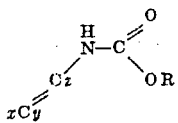

R being a radical selected from the group consisting of alkyl, alkylene, and carbocyclic radicals, and $x$, $y$, and $z$ being selected from the group consisting of hydrogen, alkyl, aryl, and alkoxy.

8. A method of preparing polymers which comprises heating together under polymerizing conditions 80–20 mol percent of vinyl acetate and 20–80 mol percent of a methyl ester of vinyl carbamic acid.

JOSEPH B. DICKEY.

REFERENCES CITED

The following references are of record in the file of this patent:

UNITED STATES PATENTS

| Number | Name | Date |
| --- | --- | --- |
| 2,165,484 | Huismann | July 11, 1939 |
| 2,247,495 | Harvey et al. | July 1, 1941 |
| 2,273,891 | Pollack et al. | Feb. 24, 1942 |
| 2,326,287 | Coffman | Aug. 10, 1943 |
| 2,334,476 | Coffman | Nov. 16, 1943 |
| 2,394,592 | Chenicek | Feb. 12, 1946 |
| 2,395,750 | Muskat et al. | Feb. 26, 1946 |

OTHER REFERENCES

Sidgwick's Organic Chemistry of Nitrogen, page 332. London 1937, Oxford.